(12) United States Patent
Dash et al.

(10) Patent No.: US 11,283,505 B2
(45) Date of Patent: Mar. 22, 2022

(54) ADAPTIVE SPATIAL DIAGNOSTICS IN A WIRELESS NETWORK

(71) Applicant: SEMICONDUCTOR COMPONENTS INDUSTRIES, LLC, Phoenix, AZ (US)

(72) Inventors: Debashis Dash, Newark, CA (US); Hossein Dehghan, Diablo, CA (US); Georgy Gilyarovskiy, Moscow (RU)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 63 days.

(21) Appl. No.: 16/857,052

(22) Filed: Apr. 23, 2020

(65) Prior Publication Data
US 2020/0259541 A1 Aug. 13, 2020

Related U.S. Application Data

(63) Continuation of application No. 16/136,180, filed on Sep. 19, 2018, now Pat. No. 10,673,506.
(Continued)

(51) Int. Cl.
| | |
|---|---|
| *H04L 23/00* | (2006.01) |
| *H04B 7/06* | (2006.01) |
| *H04W 72/04* | (2009.01) |
| *H04W 68/02* | (2009.01) |
| *H04L 5/00* | (2006.01) |
| *H04W 84/12* | (2009.01) |

(52) U.S. Cl.
CPC ......... *H04B 7/0626* (2013.01); *H04L 5/0048* (2013.01); *H04L 5/0092* (2013.01); *H04W 68/02* (2013.01); *H04W 72/0453* (2013.01); *H04W 84/12* (2013.01)

(58) Field of Classification Search
CPC ... H04B 7/0626; H04L 5/0048; H04L 5/0092; H04W 68/02; H04W 72/0453; H04W 84/12
USPC .................................................. 375/377, 224
See application file for complete search history.

(56) References Cited

U.S. PATENT DOCUMENTS

| | | |
|---|---|---|
| 9,154,969 B1 | 10/2015 | Srinivasa et al. |
| 2010/0260060 A1 | 10/2010 | Abraham et al. |

(Continued)

*Primary Examiner* — Tesfaldet Bocure
(74) *Attorney, Agent, or Firm* — Maschoff Brennan

(57) ABSTRACT

A method may include obtaining spatial diagnostics data determined independent of changes to channel state parameters associated with a communication channel; and providing a service associated with a location at which the network exists using the spatial diagnostics data. Another method may include obtaining channel state parameters associated with a communication channel, the channel state parameters changing over time; determining spatial diagnostics data independent of changes to the channel state parameters; and providing a service associated with a location at which the network exists using the spatial diagnostics data. Another method may include monitoring activity at a location based on spatial diagnostics data associated with a communication channel of a network with a WAP; and in response to detecting an unrecognized device at the location, calibrating the WAP to nullify parameters of the communication channel from the unrecognized device without disrupting communication with authorized devices.

26 Claims, 9 Drawing Sheets

Related U.S. Application Data

(60) Provisional application No. 62/641,215, filed on Mar. 9, 2018.

(56) References Cited

U.S. PATENT DOCUMENTS

| | | |
|---|---|---|
| 2017/0238236 A1 | 8/2017 | Miller et al. |
| 2018/0110038 A1 | 4/2018 | Ruan et al. |
| 2018/0294898 A1 | 10/2018 | Dogan et al. |
| 2021/0067212 A1* | 3/2021 | Pierrugues ............ H04B 7/0417 |
| 2021/0126947 A1* | 4/2021 | Wang ................. H04W 12/0433 |
| 2021/0143942 A1* | 5/2021 | Schelstraete .......... H04L 1/1614 |
| 2021/0144695 A1* | 5/2021 | Agrawal .............. H04B 1/0053 |

* cited by examiner

ADAPTIVE SPATIAL DIAGNOSTICS IN A WIRELESS NETWORK

CROSS REFERENCE TO RELATED APPLICATIONS

The present application is a continuation of U.S. application Ser. No. 16/136,180, filed Sep. 19, 2018, now issued as U.S. Pat. No. 10,673,506 on Jun. 2, 2020, and entitled ADAPTIVE SPATIAL DIAGNOSTICS IN A WIRELESS NETWORK which claims priority to U.S. provisional application No. 62/641,215, filed Mar. 9, 2018, and entitled "ADAPTIVE CSI PRE-PROCESSING FOR EFFICIENT SPATIAL DIAGNOSTICS USING WIFI". The Ser. No. 16/136,180 application and the 62/641,215 application is each incorporated herein by reference in its entirety for all purposes.

BACKGROUND

A network for communications, including for cable television, phone, and internet data traffic, typically includes a base station, one or more head-ends, one or more intermediate hubs, and the subscriber facilities. The subscriber facilities typically represent the end of the line and include one or more modems, routers, and the consuming technology—phones, televisions, computers, laptops, electronic tablets, smartphones, InternetOfThings (IoT) devices, and other internet enabled devices. These devices can communicate over a network, such as a wireless local areas network (WLAN). WLANs can be established and serviced using a device called a Wireless Access Point (WAP). The WAP wirelessly couples all the devices of the network to one another and to the subscriber facility through which Internet, video, and television is delivered to the home. Most WAPs implement a communications standard such IEEE 802.11 for handling data communications among multiple competing devices for a shared wireless communication medium on a selected one of a plurality of communication channels. In a conventional network, data communications between internet enabled devices is associated with characteristics that can be utilized to infer properties of the transmission channel through which the data is transmitted. The inferred properties can be used to detect changes in a physical environment that includes the internet enabled devices. However, the characteristics associated with the data transmission between devices is not optimized for readily detecting changes in a physical environment.

BRIEF DESCRIPTION OF THE DRAWINGS

Various embodiments in accordance with the present disclosure will be described with reference to the drawings, in which.

DETAILED DESCRIPTION

Figure 1:
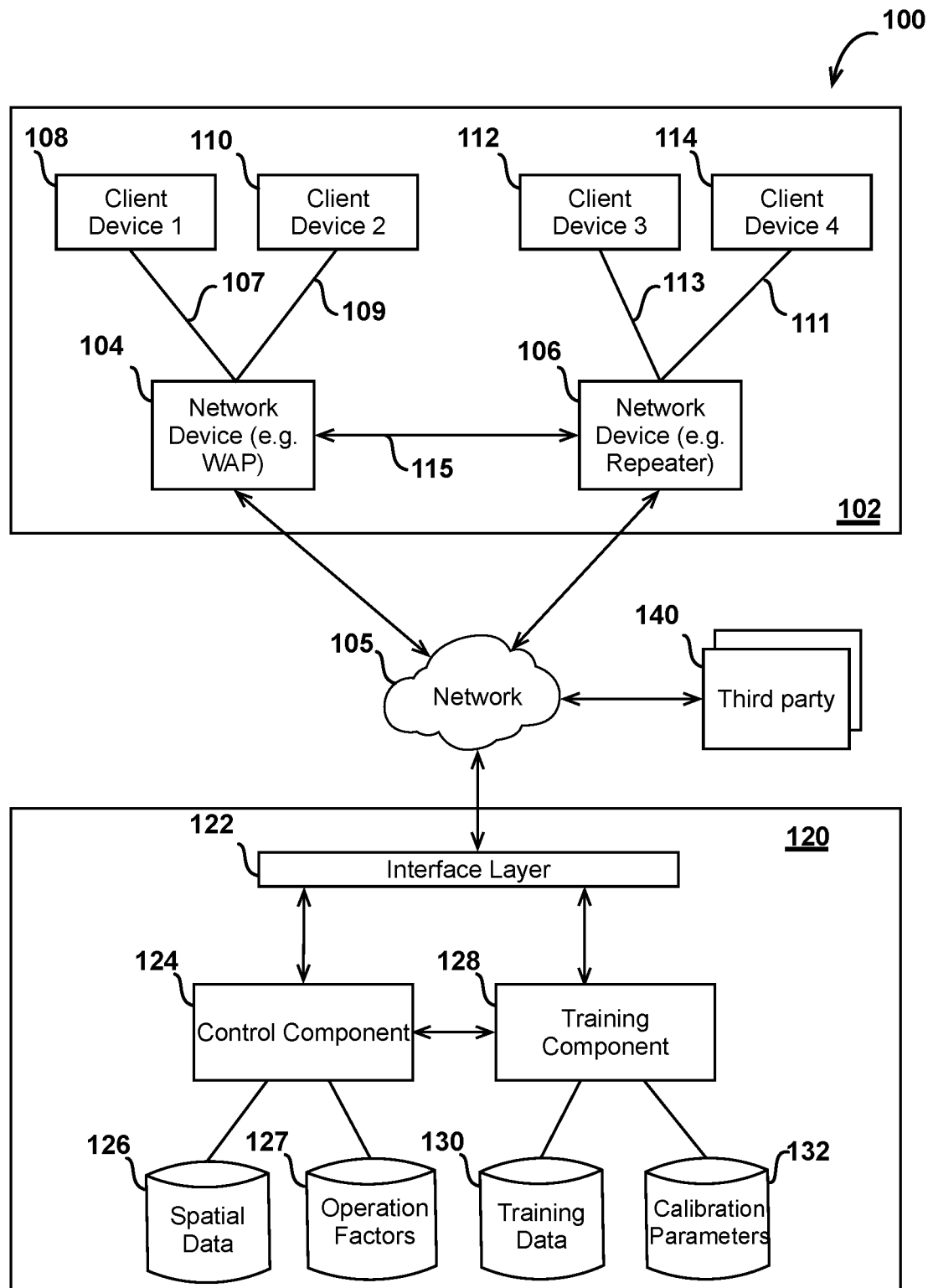
FIG. 1 illustrates an example system that can be utilized in accordance with various embodiments.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Systems and methods in accordance with various embodiments of the present disclosure may overcome one or more of the aforementioned and other deficiencies experienced in conventional approaches to processing channel state parameters in a dynamically changing network environment. In particular, various embodiments describe systems and methods for accurate spatial diagnostics and channel state information (CSI) recording due to dynamic channel and bandwidth changes and other changes in a wireless local area network (WLAN).

In accordance with various embodiments, data transmissions such as channel soundings of a network (e.g., a wireless local area network), including data communications between networked computing devices (e.g., a wireless access point (WAP) node and associated station nodes) on a communication link of the network, can be obtained. The data communications can be obtained by a control component or other such component or device located in the network and/or in communication with the network. CSI refers to known channel properties of the communication link. This information describes how a signal propagates from the transmitter to the receiver and represents the combined effect of, for example, scattering, fading, and power decay with distance. In various embodiments, a system with multiple transmit and receive antennas (MIMO), can be modeled as, for example, $y=Hx+n$, where y and x are the receive and transmit vectors, respectively, and H and n are the channel matrix and the noise vector, respectively. It should be noted that H or any function of H can be modeled in one of a number of different ways, and modeling the system as shown is just one example as those in the art will appreciate.

The data communications can be associated with channel state parameters that can describe characteristics of the channel through which data is transmitted. As will be described further herein, channel state parameters can include bandwidth information, location information for bandwidths with respect to an entire band, location information for pilot, DC, guard subcarriers, dimension of H, among other such information. The channel state parameters can be monitored overtime to detect a trigger event on the network. A type of trigger event can be determined based on channel state parameters before and after the event. Trigger event types can include, for example, a channel change, a bandwidth change, a restart of a WAP, etc. Optimization parameters (e.g., operation parameters, calibration parameters, etc.) or other such parameters can be determined based on the type of trigger event. The parameters can be applied to an appropriate computing device to dynamically account for changes to channel, bandwidth, etc. of the communication link as a reaction to current channel, traffic, and interference conditions. Thereafter, CSI from the communication link can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

In accordance with various embodiments, to ensure acceptable spatial diagnostics of a dynamically changing network, channel state parameters associated with data communications from a communication link may be preprocessed to account for changes in the channel state parameters due to changes in channel and/or bandwidth. Dynamic changes to channel and/or bandwidth can occur in response to one of a number events, including, for example, changes to network traffic, interference conditions, and/or other such conditions. Embodiments described herein allow for spatial diagnostics to be determined reliable independent of changes to channel state parameters. For example, changes in bandwidth can change the ordering of the relative position of data subcarriers depending on the location of primary and secondary subchannels, which would not allow for spatial diagnostics to be determined reliable independent of changes to channel state parameters. In another example, the location of data subcarriers can vary between different bandwidths which might result in false alarms in spatial diagnostics if, for example, solely based on changes to CSI. In yet another example, the response of filters and/or frontend for different bandwidths may vary which would not allow for spatial diagnostics to be determined reliable independent of changes to channel state parameters. In yet another example, a convergence time or other appropriate amount of time may be required to allow for spatial diagnostics to converge to a stable estimate before it can be used reliably.

Accordingly, in various embodiments, a control component or other such component, device, or service, remote or local a wireless local area network (WLAN), can coordinate optimization parameters (e.g., operation parameters, calibration parameters) or other such parameters between computing devices (e.g., a WAP, a repeater, etc.) on the WLAN based on one or more events or changes in at least one communication link through which the computing devices communicate. In an embodiment, the control component can apply operation parameters to update a computing device (e.g., a WAP) to compensate for changes in channel and/or bandwidth due to current channel, traffic, and interference conditions, allowing for spatial diagnostics that satisfy a threshold level of acceptance. Further, the control component can learn operation characteristics of new devices that join the network and apply calibration parameters to update the computing device (e.g., the WAP) to compensate for changes to the network due to the new device. Further still, the control component can operate in a "fast-learning mode" or at a higher sampling rate, higher resolution, etc. to quickly determine operation parameters and/or calibration parameters to eliminate or at least reduce an amount of time to reach an acceptable level of accuracy or other such threshold level of accuracy. Advantageously, instead of a computing device (e.g., a WAP) merely serving as a bridge for coupling the computing devices (e.g. internet enabled devices) to the Internet, the computing device (e.g., the WAP) forming the WLAN can take on an additional role as an independent source of content, i.e. spatial diagnostics data because the CSI can be extracted reliably independent of changes related to channel state parameters. The provision of this spatial diagnostics data by the existing WLAN avoids the redundancy and obviates the need for many of the additional wireless devices currently vying for inclusion in a residential and commercial WLAN. In many cases, the sensing and monitoring capabilities which these devices offer, can instead be harvested directly from the existing WLAN nodes during the course of their normal operation. This spatial diagnostics data obviates the need for dedicated sensors and devices within a wireless environment and allows application developers to provide applications servicing the various markets.

Various other functions and advantages are described and suggested below as may be provided in accordance with the various embodiments.

FIG. 1 illustrates an example system 100 that can be utilized in a dynamically changing network environment in accordance with various embodiments. In this example, network devices 104 and 106 in a wireless location area network (WLAN) 102 can communicate with each other and with client devices 108, 110, 112, and 114 and across at least one network 105 with a resource provider environment 120. Network devices 104 and 106 can include any appropriate electronic device operable to send and receive requests, messages, or other such information over an appropriate network 105 and convey information back to an appropriate network device(s). Examples of a network device include a wireless access point (WAP), a repeater, and the like. Example client devices, or station nodes, include electronic devices capable of communicating over a wireless signal. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

The network(s) 105 can include any appropriate network, including an intranet, the internet, a cellular network, a local area network (LAN), or any other such network or combination, and communication over the network can be enabled via wired and/or wireless connections.

The resource provider environment 120 can include any appropriate components for receiving requests and returning information or performing actions in response to those requests. As an example, the provider environment 120 might include web servers and/or application servers for receiving and processing requests, then returning data, web pages, video, audio, or other such content or information in response to the request. While this example is discussed with respect to the internet, web services, and internet-based technology, it should be understood that aspects of the various embodiments can be used with any appropriate services available or offered over a network in an electronic environment.

In various embodiments, the resource provider environment 120 may include various types of resources that can be utilized for analyzing data communications between network and client devices. In this example, the provider environment 120 includes control component 124 and training component 128. Although control component 124 and training component 128 are shown as single components, control component 124 and training component 128 may be hosted on multiple server computers and/or distributed across multiple systems. Additionally, the control and training component may be performed by any number of different computers and/or systems. Thus, the control and training component may be separated into multiple services and/or over multiple different systems to perform the functionality described herein. In various embodiments, control component 124, training component 128, and other such components in environment 120 or at least functions performed by such components can be included in, for example, network device 104.

In accordance with an embodiment, data communications between network device 104 and client devices 108 and 110 can include channel soundings 107 and 109, data communications between network device 106 and client devices 112 and 114 can include channel soundings 111 and 113, and data communications between network device 104 and network device 106 can include channel sounding 115.

A channel sounding can be intermittent probes sent from a network device identifying one or more client devices from which sounding feedback is requested. The response to the probe from the recipient client devices can contain information which allows a network device to quantify the characteristics of the channel between it and a respective client device. The data communications themselves may be sent from a network device to one or more client devices or from a client device to the network device. The data communications can be sent over, for example, eight 20 MHz communication channels. In this example, individual communication channels may be selected individually to support a WLAN. Alternately, more than one of the 20 MHz channels can be aggregated in various combinations to form a 40 MHz, 80 MHz or 160 MHz aggregate channel to support WLAN communications. In an embodiment, each 20 MHz communication channel is orthogonal frequency division multiplexed (OFDM), i.e., divided into subchannels or tones. Each 20 MHz channel has 56 independently modulated subcarriers or tones. A communication channel can include subchannels, also referred to as tones. In an embodiment, such a channel layout can correspond to that specified in IEEE 802.11ac, for example. In accordance with various embodiments, the soundings can be implicit and, accordingly, do not require additional sounding handshakes or packets to perform updates to a WAP or other such computing device. For example, data packets between computing devices used during implicit beamforming can be used to update the WAP.

Once the communication links 107 and 109 between network device 104 and respective client devices 108 and 110 the links are established, an explicit sounding request and response can take place. The recipient client devices 108 and 110 can determine indicia of these channel characteristics and pass these channel characteristics as sounding feedback response packet(s) back to network device 104 to establish subsequent MIMO beamforming of data communications. In accordance with various embodiments, the channel characteristics can be stored as link channel state information (CSI) from which spatial diagnostics data can be calculated by and/or provided to control component 124 over network 105. As shown, control component 124 is located in service provider environment 120; however, control component 124 or functions performed by control component 120 can be performed by network device 104 or other such device and/or performed across WLAN 102 and service provider environment 120 by appropriate computing components.

In this example, network device 104 can provide a request and/or appropriate information across network 105 to resource provider environment 120. It should be noted, however, that control component 124 can initiate communication as may include requesting information with network device 104 using any appropriate communication protocol. The information can include channel state parameters. In accordance with various embodiments, channel state parameters can describe characteristics of a communication link through which data is transmitted. Channel state parameters can include bandwidth information, location information for bandwidths with respect to an entire band, location information for pilot, DC, guard subcarriers, timing information indicating how long the control component has been processing channel state parameters for the same environment, among other such information. The information can be received to network interface layer 122 of the content provider 120. The network interface layer 122 can include any appropriate components known or used to receive requests and/or information from across a network, such as may include one or more application programming interfaces (APIs) or other such interfaces for receiving such requests. The network interface layer 122 might be owned and operated by the provider or leveraged by the provider as part of a shared resource or "cloud" offering. The network interface layer can receive and analyze the information, and cause at least a portion of the information to be directed to an appropriate system or service, such as control component 124.

Control component 124 can analyze the information to determine characteristics of the channel through which data is transmitted. The characteristics can be monitored overtime to determine calibration parameters for a new device, operation parameters due to changes in the network, and to apply the calibration parameters and/or operation parameters to account for network changes to channel, bandwidth, etc. due to current channel, traffic, and inference conditions. Thereafter, CSI from the communication link can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

In accordance with various embodiments, analyzing the channel state parameters can occur in parallel with data communications and thus without disrupting WLAN data communications. As described, however, changes to channel, bandwidth, etc. of a communication link can occur in response to changes to the current channel, traffic, and interference conditions. In accordance with various embodiments, to accurately track, monitor, and compensate channel state parameters over time, or at least to a threshold level of acceptance, a frequency-based technique, training- and calibration-based technique, and a fast-learning technique may be implemented.

For example, control component 124 or network devices 104 and 106 can detect a trigger event. The event can be detected by a trigger detection component, for example. The trigger detection component can be included with the control component or in communication with the control component. A trigger event or other such event can include, for example, a change in channel for a data communication between communication computing devices, a change in bandwidth for a data communication between computing devices, detection of a new device on the network, restart on the WAP, control component, or other such appropriate component, etc. Once a trigger event is detected, a trigger identification component can determine a type of trigger event based on channel state parameters before and after the event. The trigger detection component can be included with the control component or in communication with the control component. An operating parameter optimization component included with or in communication with the control component can be configured to determine operation and/or calibration parameters.

For example, in the situation where the trigger event is a change in channel, a subchannel location scenario before the trigger event and after the trigger event can be identified. A subchannel location scenario can be based on the bandwidth and the location of a primary channel. As will be described further herein, a scenario includes a primary 20-megahertz channel, a secondary 20-megahertz channel, and a secondary 40-megahertz channel. Once the subchannel location scenario before the event and after the event is identified, a mapping index to map the current scenario to a reference scenario can be identified. Mapping can include, for example, ordering sub bands of the current scenario to match sub bands of a reference scenario. In the situation where the trigger event is a change in bandwidth, one or more subcarriers can be nullified (e.g., zeroed out) to account for the different locations of pilot, DC, and guard subcarriers between bands. In the situation where the trigger event is detection of a new device on the network, communications from the new device can be used to attempt to recognize the new device. In certain embodiments, the communications can be one of an implicit or an explicit signal. An example of an implicit signal includes signals that can be used as a training signal. This can include data communications as described herein from the new device. An example of an explicit signal includes a training signal.

In an embodiment, the new device can be associated with identification information such as a MAC address. In this example, a determination can be made whether the identification information matches stored identification information listed in a lookup table associated with a computing device (e.g., WAP, repeater, etc.) and/or stored in a database accessible to an appropriate computing device. The appropriate computing device and/or database can be local to the network, remote to the network, or a combination thereof. In various embodiments, other searching approaches known in the art can be utilized to determine whether information for the new device is available to one or more devices associated with the network. In the situation where no entry for the new device is listed in the lookup table, or otherwise not stored in the database or available to other devices, the new device can be classified as an unrecognized device. Thereafter, calibration parameters, operation parameters, or other such parameters associated with the new device can be determined and can be stored, written to an appropriate lookup or other table, and/or applied to an appropriate network device. In the situation where a match is determined, parameters associated with the new device can be obtained and applied to an appropriate device.

In certain embodiments, the parameters can be applied to a device in communication with the unrecognized device, such as a WAP or other such device, or shared with a device not in communication with the unrecognized device. For example, the parameters can be shared with a different device local to the network such as a repeater on the network. In another example, the parameters can be shared with a remote device, such as a WAP, repeater, management device, or other such device on a remote network.

In accordance with various embodiments, in response to any type of event, the control component can operate at an increased sampling rate, resolution, etc. for a period of time. Thereafter, a set of operation and/or calibration parameters or other such parameters can be determined. The parameters can be stored in data store 127 and/or applied to the WAP, for example, to update the WAP to compensate for changes in channel and/or bandwidth due to current channel, traffic, and interference conditions, allowing for spatial diagnostics that satisfy a threshold level of acceptance.

As described, the control component 124 can be located on network device 104, 106, or remote environment 120. In the situation control component 124 is located on network device 104, the control component on network device 104 can utilize channel state parameters on channel links 113 and 111 to determine optimization parameters (e.g., operation and/or calibration parameters) for network device 106 in accordance with the embodiments described herein. The optimization parameters can be stored and/or applied to network device 106.

In accordance with an embodiment, a new or otherwise unrecognized device may be detected on the WLAN. In such a situation, the unrecognized device can send one of an implicit or explicit training signal or other such signal to interface 122. Interface 122 can provide the signal to training component 128 and/or store the signal and other associated data in data store 130. In an embodiment, the signal can be configured for channel estimation, e.g., Wifi preamble, NDP, etc. Training component 128 can use the signal to determine calibration parameters or other such parameters. The calibration parameters can be stored in data store 132 or other appropriate data store and/or applied to the network devices to compensate for changes to the WLAN. In accordance with an embodiment, the calibration parameters can include CSI correction parameters, sampling frequency parameters, collection periodicity parameters, data decimation parameters, data resolution parameters, filtering parameters, pre-defined beam forming parameters or compensation patterns, etc. In an embodiment, sampling frequency parameters, collection periodicity parameters, data decimation parameters, data resolution parameters can be considered operation parameters. In various embodiments, calibration can include cycling through pre-defined beamforming patterns or other compensation patterns that are based on a client type, send additional soundings, fixed CSI correction parameters to find the best CSI correction parameters using feedback, and calculating optimal transmission parameters as part of the calibration parameters for CSI sampling. This can include, for example, calibrating each channel and bandwidth where new pre-processing weights for normalization can be determined for use in the calibration parameters. Thereafter, an unrecognized device calibration (per link) on system startup can be determined.

In accordance with various embodiments, in response to a change in channel, bandwidth, detecting an unrecognized device, a restart of a device, or other such event, the control component 124 and other such components (e.g., training component 128) may operate in a "fast-learning" mode or at a higher sampling rate to quickly determine operation parameters and/or calibration parameters to eliminate or at least reduce an amount of time in adapting to the changes. In accordance with various embodiments, the fast-learning mode can include increasing from a first sampling rate to a second sampling rate for a period of time, where the second sampling rate is greater than the first sampling rate. Additionally, a higher resolution might be chosen for each CSI sample and lower decimation might be chosen for the CSI data. Once the calibration parameters and/or correction factors are determined, and/or the frequency-based technique is complete (e.g., band remapping, subcarrier remapping, nullification), the control component 124 and/or training component 128 can sample at the first sampling rate or some other sampling rate.

A third-party entity 140 can be authorized to access various types of spatial diagnostics data derived from data store 126 from WLAN channel soundings, which in turn can be accessed by a range of applications servicing the needs of residential and business subscribers. For example, as the WLAN nodes (e.g., devices 104, 106, 108-114) conduct their channel soundings associated with MIMO beamforming for user data communication, they can aggregate the CSI information from the soundings over time independent of changes related to channel state parameters. As described, at least network devices 104 and 106 are programmed with appropriate operation parameters and/or calibration parameters. Aggregation of the CSI, e.g. link channel matrices H can be stored in a link CSI table in a data store 128. The link channels can be analyzed for perturbations in the channel coefficients. The links associated with the temporary perturbations in the link channels can be individually analyzed to determine whether the perturbations are consistent with human activity in the residence, and if so the path of the activity. The time and path of this human activity and or the temporary perturbations of the associated links can be stored as records in a spatial diagnostics data table in data store 126.

In accordance with various embodiments, the spatial diagnostics data can be made available to third party developers via application programming interfaces (API)s 122. This allows the developers to create homeowner facing applications for WLAN servicing, home security, smart home, and health monitoring within each homeowner's residence that can be used generate alerts, notifications, and provide other such services. The spatial diagnostics data can be useful in diagnosing issues with WLAN operation since one of the causes of such issues may be movement of a device node from a location at which performance was acceptable, to a new location at which service interruptions are experienced. The spatial diagnostics data can be useful in home security scenarios such as determining the presence of an intruder in the home and generating an alert to warn of such intruder. The spatial diagnostics data can be used in smart home scenarios such as turning devices or utilities on or off depending on the presence or absence of a human in a room of the residence. The spatial diagnostics data can also be useful for health monitoring of an elderly person in a home to track their activity or determine whether they have had a fall. Each of these potential consumer facing applications use as their foundation the spatial diagnostics data aggregated from the homeowner's own residence from their WLAN without interrupting or degrading the normal WLAN communication function.

Figure 2A:
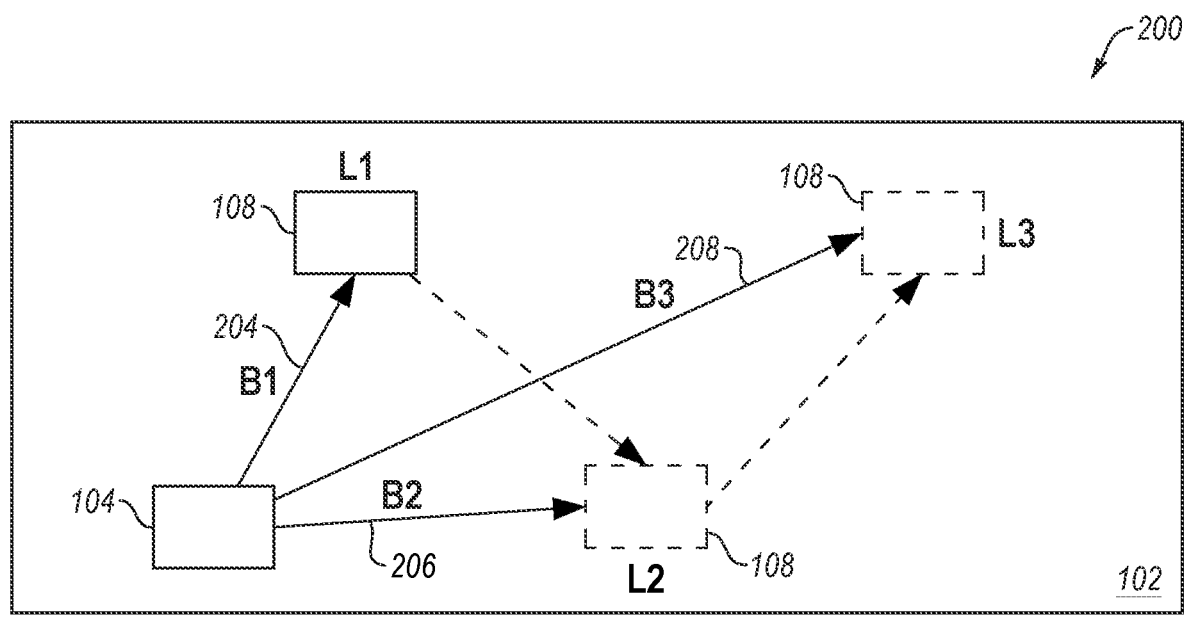
FIGS. 2A and 2B illustrate example changes in channel state parameters in accordance with various embodiments.
Figure 2B:
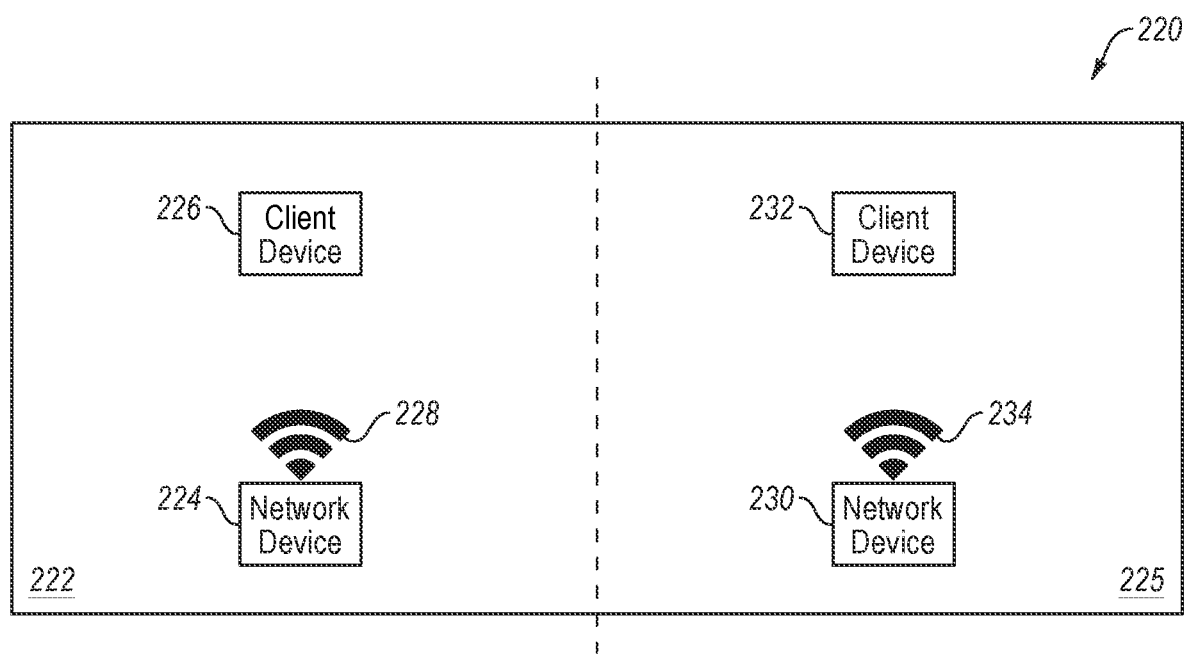

FIGS. 2A and 2B illustrate example changes in channel state parameters in accordance with various embodiments. Example 200 of FIG. 2A, illustrates a change in bandwidth type trigger event. In this example, network device 104 (e.g., WAP 104 in FIG. 1) can communicate with client device 108 (e.g., station node 108 in FIG. 1) in WLAN 102 via communication link 204. The client device can be located at a first location indicated by L1 and communication link 204 can be associated with channel state parameters that includes an 80 MHz band (B1). In the situation where client device 108 is moved from the first location (L1) to a second location (L2), network device 104 can communicate with client device 108 via communication link 206. Communication link 206 can be associated with channel state parameters that includes a 40 MHz band (B2). In the situation where client device 108 is moved from the first location (L2) to a third location (L3), network device 104 can communicate with client device 108 via communication link 208. Communication link 208 can be associated with channel state parameters that includes a 20 MHz band (B3). In response to a change in bandwidth, for example, a change from B1 to B2 or B2 to B3 due to a change in location of client device 108, operation parameters can be determined in accordance with the various embodiments described herein and applied to network device 104 so that channel state information (CSI) from the communication link can be extracted independent of bandwidth changes.

Example 220 of FIG. 2B, illustrates a change in channel type trigger event. In this example, wireless network environment 222 can include network device 224 and client device 226. Network device 224 can communicate with client device 226 via communication link 228. Communication link 228 can be associated with channel state parameters that includes a first channel. Environment 222 might be neighboring environment 225, for example, because the environments are in neighboring homes, businesses, or other such establishments. Network device 230 can communicate with client device 232 via communication link 234. Communication link 234 can be associated with channel state parameters that includes a second channel. During a first period of time, the first channel and the second channel can be the same channel, for example, channel 36. In this example, during a second period of time, data traffic on the second channel is increased, for example, due to streaming video on communication link 234. As a result of the increased data traffic, communication link 228 changes to a third channel (e.g., channel 149), which is different from the first channel (e.g., channel 36). In response to the channel change, operation parameters can be determined in accordance with the various embodiments described herein and applied to network device 224 so that channel state information (CSI) from the communication link can be extracted independent of channel changes.

Figure 3:
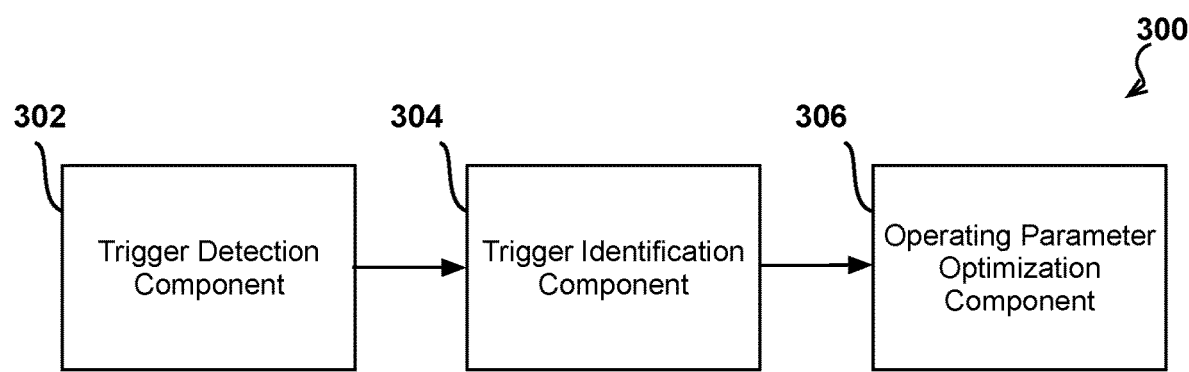
FIG. 3 illustrates an example state diagram that can be utilized in accordance with various embodiments.
Figure 4A:
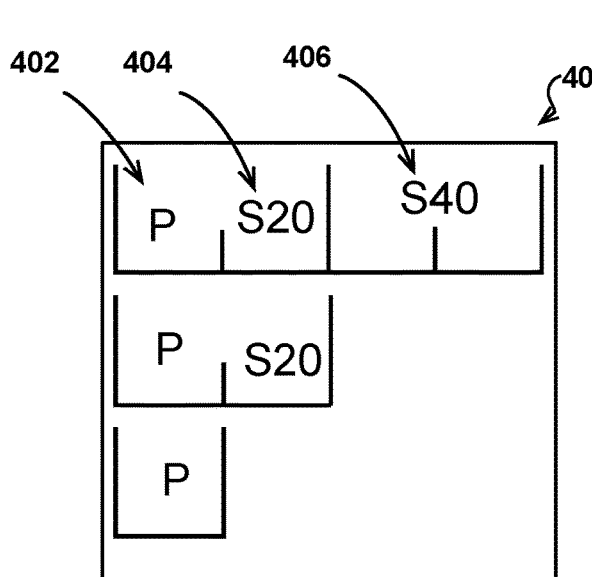
FIGS. 4A, 4B, 4C, and 4D illustrate example scenarios that can be utilized in accordance with various embodiments.
Figure 4B:
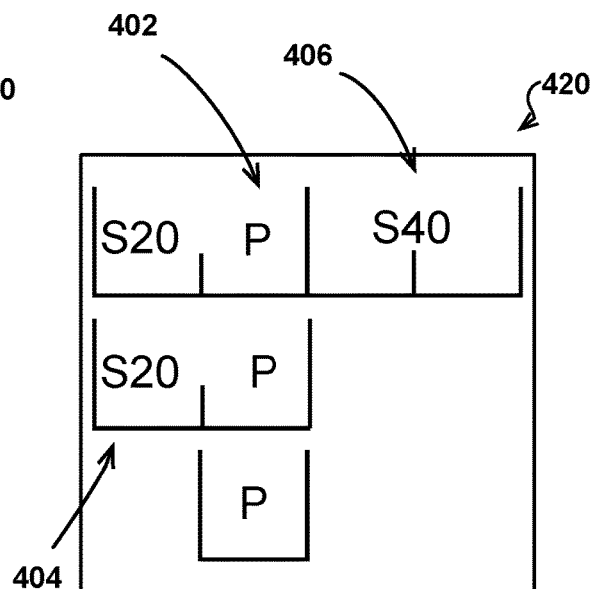
Figure 4C:
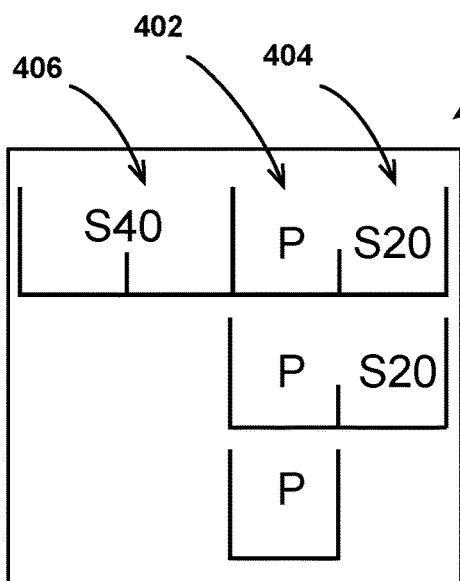
Figure 4D:
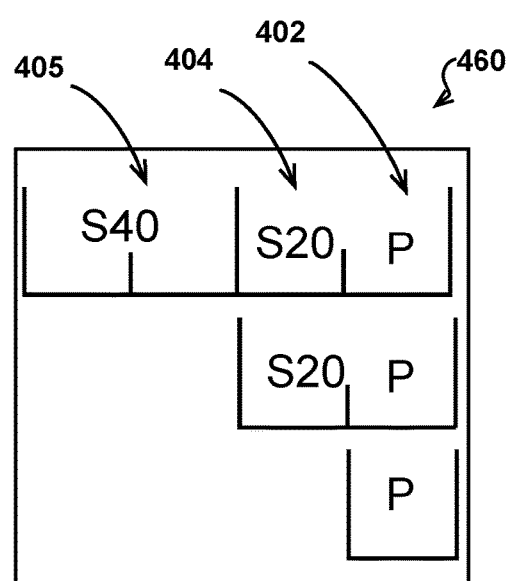

A change in bandwidth and/or a change in channel are two example trigger events that can be detected by a trigger detection component, such as trigger detection component 302 of FIG. 3. Other trigger events can include detection of an unknown device, restart of a network, etc. Once a trigger is detected, the trigger can be identified. For example, trigger identification component 304 can identify a type of trigger based on channel state parameters before and after the trigger event. For example, the set of channel state parameters can be analyzed to determine a channel change, a bandwidth change, whether the network was restarted, etc. Operating parameter optimization component 306 can be configured to determine optimization parameters (e.g., operation and/or calibration parameters). For example, in the situation where the type of trigger event is a channel change, a control component of other such component can equalize the power change due to the change in channel so that channel state information (CSI) from a communication link can be extracted independent of changes related to the change in channel. In accordance with various embodiments, changes in bandwidth can change the ordering of relative positions of subcarriers depending on the location of a primary subchannel (also referred to as band), a secondary-20 megahertz subchannel, and a secondary-40 megahertz subchannel. To facilitate extraction of CSI independent of changes related to a channel change, a current subchannel ordering is reordering to match a reference ordering. For example, once a change in channel is detected, a subchannel location scenario before the trigger event and after the trigger event can be identified.

FIGS. 4A-4D illustrate example scenarios that can be identified before and after a trigger event. As shown in example scenario 400 ("scenario 1") of FIG. 4A, scenario 1 includes primary channel 402 which is a 20-megahertz channel subchannel, a second 20-megahertz subchannel 404, and a secondary 40-megahertz subchannel 406 for an 80-megahertz channel. Scenario 420 ("scenario 2") is identified with the subchannel locations shown in FIG. 4B. In accordance with an embodiment, the order of subcarriers can change when going from a 40-megahertz subchannel to a 20-megahertz subchannel. Scenario 440 ("scenario 3") is identified with the subchannel locations shown in FIG. 4C. As shown in scenario 3, the order of subcarriers changes when going from an 80-megahertz channel to a 40-megahertz subchannel. Scenario 460 ("scenario 4") is identified with the subchannel locations shown in FIG. 4D. As shown in scenario 4, the order of subcarriers changes when going from an 80-megahertz channel to a 40-megahertz subchannel and from a 40-megahertz channel to a 20-megahertz subchannel. In accordance with various embodiments, scenarios 1-4 include the possible combination for an 80-megahertz channel.

Once the subchannel location scenario before and after the trigger event is identified, the bandwidth and location of the primary subchannel before and after the trigger event is identified. As described, the bandwidth and location of the primary subchannel can be used to identify a scenario as belonging to one of the above described scenarios (e.g., scenarios 1-4). A mapping index is determined based on the scenario before the event and after the event. The mapping index can include a lookup table or other such reference or process that can be used to reorder sub-bands to a reference or default scenario. Once the sub-bands are reordered, subcarrier nullification can be performed based on the mapping index. Subcarrier nullification can eliminate or at least reduce a likelihood of false detections of movement due to location changes of sub-bands and/or subcarriers. These changes can be result in the reordering of the bands or a change in bandwidth. For example, each communication channel may be selected individually to support a wireless local area network (WLAN). One or more of the 20 MHz channels can be aggregated in various combinations to form a 40 MHz, 80 MHz, or 160 MHz aggregate channel to support WLAN communications. Each 20 MHz communication channel is orthogonal frequency division multiplexed (OFDM), i.e. divided into subchannels or tones. Each 20 MHz channel has 56 independently modulated subcarriers or tones. Different bandwidths (e.g., a 20-megahertz bandwidth, an 80-megahertz bandwidth, etc.) have different locations of pilot, DC, guard subcarriers among other such sub-carrier types. In accordance with various embodiments, a pilot signal is a signal, usually a single frequency, transmitted over a communications system for supervisory, control, equalization, continuity, synchronization, or reference purposes. A guard band is an unused part of the radio spectrum between radio bands, for the purpose of preventing interference.

Figure 5:
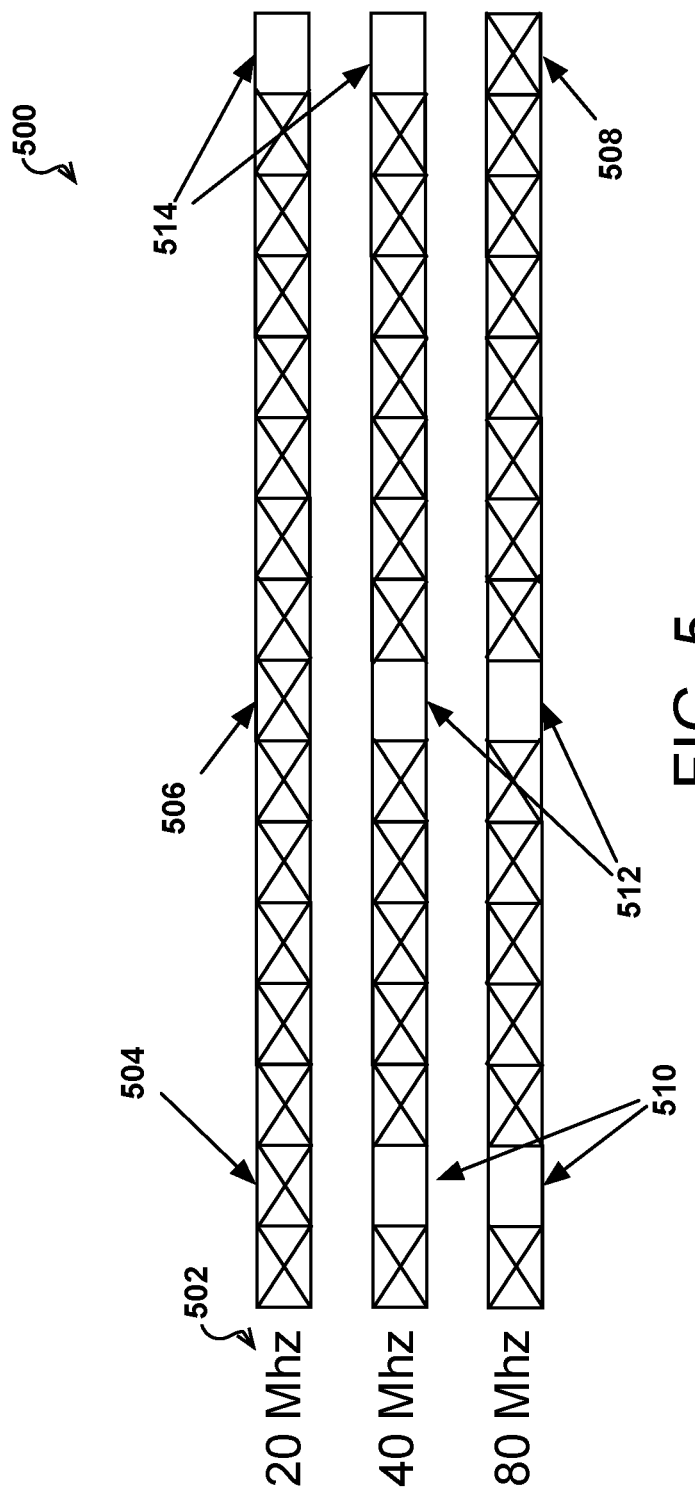
FIG. 5 illustrates an example nullification approach that can be utilized in accordance with various embodiments.

In accordance with an embodiment, reordering the sub-bands and/or a change in bandwidth can cause the pilot signals, guard bands, and other such signals and/or bands to misalign. As a result, a switch from, e.g., an 80-megahertz band to a 40-megahertz band may cause locations which had data to have pilots, guard bands, etc. Accordingly, once the sub-bands are ordered and/or there is a change in bandwidth, signals not common between bands are zeroed out to allow for consistency of data subcarriers. For example, as shown in example nullification process 500 of FIG. 5, bands 502 (e.g., a 20 MHz band, a 40 MHz band, and an 80 MHz band) include data subcarriers 504, 506, and 508; pilot subcarriers 510, guard bands 512, and DC subcarriers 514. In this example, pilot subcarriers 510 occur in the 40 MHz band and the 80 MHz band but not the 20 MHz band. As such, data subcarrier 504 in the 20 MHz band is zeroed out to match pilot subcarriers. Guard subcarriers 512 occur in the 40 MHz band and the 80 MHz band but not the 20 MHz band. As such, data subcarrier 506 in the 20 MHz band is zeroed out to match guard subcarriers. DC subcarriers 514 occur in the 20 MHz band and the 40 MHz band but not the 80 MHz band. As such, data subcarrier 508 in the 80 MHz band is zeroed out to match the DC subcarriers.

Figure 6:
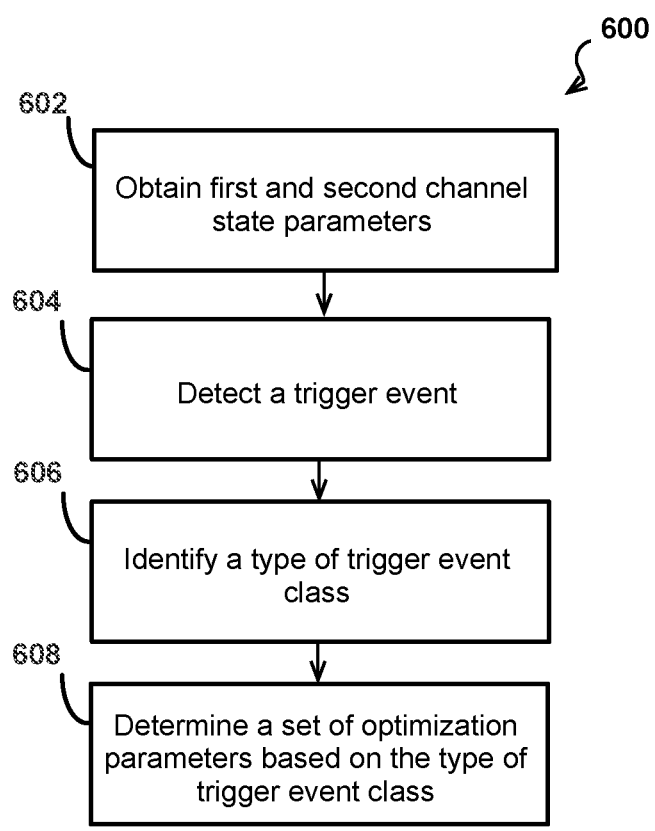
FIG. 6 illustrates an example process for determining optimization parameters in accordance with various embodiments.

FIG. 6 illustrates an example process 600 for determining optimization parameters for spatial diagnostics data in accordance with various embodiments. It should be understood that, for any process described herein, that there can be additional or fewer steps performed in similar or alternative orders, or in parallel, within the scope of the various embodiments unless otherwise stated. In this example, first channel state parameters and second channel state parameters are obtained 602 from a communication channel between computing devices in a network. The channel state parameters can include bandwidth information, location information for bandwidths with respect to an entire band, location information for pilot, DC, guard subcarriers, among other such information. A trigger event is detected 604 on the network. A trigger type class is identified 606 based at least in part on the first channel state parameters and the second channel state parameters. Trigger event types can include, for example, a channel change, a bandwidth change, a restart of a WAP, etc. Detected a trigger event can include detecting a channel change, a bandwidth change between communicating devices. Identifying a type of trigger event can include determining channel and/or bandwidth changes using the channel state parameters. For example, the channel state parameters can be monitored to detect such events. A set of optimization parameters (e.g., operation and/or calibration parameters) is determined 608 based at least in part on the type of trigger event.

For example, in the situation where the type of trigger event is a change in channel, a subchannel location scenario before the trigger event and after the trigger event can be identified. Once the subchannel location scenario before the event and after the event is identified, a mapping index to map the current scenario to a reference scenario can be identified. Mapping can include, for example, ordering sub bands of the current scenario to match sub bands of a reference scenario. The information used for mapping can be stored and/or applied to an appropriate device (e.g., a WAP or repeater) as operation parameters.

In the situation where the type of trigger event is a change in bandwidth, for example, a change from a first bandwidth to a second bandwidth, one or more subcarriers can be nullified (e.g., zeroed out) in the second bandwidth to account for the different locations of pilot, DC, and guard subcarriers between bands. The nullification information can be stored and/or applied to an appropriate device (e.g., a WAP or repeater) as operation parameters.

In the situation where the trigger event is detection of a new device on the network, communications from the new device can be used to attempt to recognize the new device. For example, the new device can be associated with identification information such as a MAC address. A determination can be made whether the identification information matches stored identification information listed in a lookup table associated with a computing device (e.g., WAP, repeater, etc.) and/or stored in a database accessible by an appropriate computing device. The appropriate computing device and/or database can be local to the network, remote to the network, or a combination thereof. In the situation where no entry for the new device is listed in the lookup table, or otherwise not stored in the database or available to other devices, the new device can be classified as an unrecognized device. Thereafter, calibration parameters, operation parameters, or other such parameters associated with the new device can be determined and can be stored, written to an appropriate lookup or other table, and/or applied to an appropriate network device. In the situation where a match is determined, parameters associated with the new device can be obtained and applied to an appropriate device.

In any such situation, the control component can operate at an increased sampling rate, additional sounding, higher resolution, higher bandwidth, etc. for a period of time to eliminate or at least reduce an amount of time in adapting to bandwidth and/or channel changes, recognizing a new device, restart of a network device, control component, etc. For example, a control component can operate from a first sampling rate to a second sampling rate for a period of time, where the second sampling rate is greater than the first sampling rate.

Figure 7:
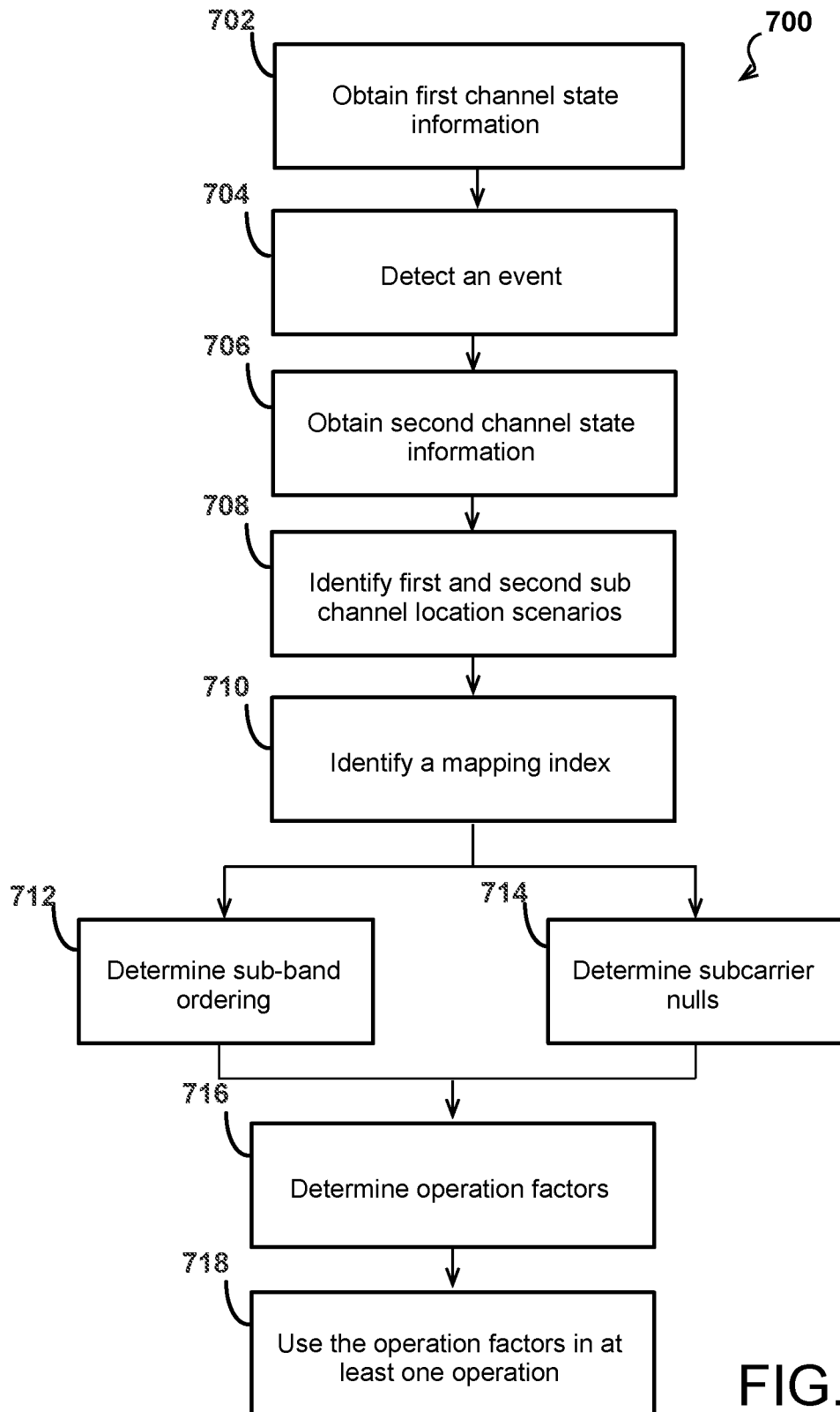
FIG. 7 illustrates an example process for determining operation parameters in accordance with various embodiments.

FIG. 7 illustrates an example process 700 for determining operation parameters for spatial diagnostics data in accordance with various embodiments. In this example, a plurality of network devices (e.g., a WAP, a repeater) in a WLAN can communicate data communications with each other and with station nodes (e.g., client devices) and across at least one network with a resource provider environment. In an embodiment, the data communications can include channel soundings and/or other data communications between a network device (e.g., a WAP) and a station node. A channel sounding can be intermittent probes sent from the network device identifying one or more station nodes from which sounding feedback is requested. The response to the probe from the recipient client devices can contain information which allows the network device to quantify the characteristics of the channel between it and a respective client device. The data communications themselves may be sent from the network device to one or more station nodes or from a station node to the network device. The data communications can be sent over, for example, eight 20 MHz communication channels. A communication channel can include subchannels, and the subchannels can include subcarriers. As will be apparent to those skilled in the art, data communications may be between two station nodes where the network device "overhears" the data communications and from the data communications determines optimization parameters. For example, a network device including a control component or in communication with the control component can analyze channel state parameters from a channel link between a pair of station nodes to determine optimization parameters (e.g., operation and/or calibration parameters) in accordance with the embodiments described herein.

In this example, first channel state parameters from a communication link between a WAP and a station node on the WLAN during a first period of time is obtained 702. However, as described, the channel state parameters can be from a communication link between a first station node and a second station node. The first channel state parameters can include a first primary band at a first location. A trigger event on a wireless local area network (WLAN) can be detected 704. As described, a trigger event can include, for example, a change in channel for a data communication between communication computing devices, a change in bandwidth for a data communication between computing devices, detection of an unknown device on the network, etc. Second channel state parameters from the communication link during a second period of time can be obtained 706. The second period of time can occur after the first period of time, the second channel state parameters can include a second primary band at a second location. In this example, the first period of time can be before the trigger event, and the second period of time can be after the trigger event. A first subchannel location scenario and a second subchannel scenario can be identified 708 based at least in part on the first location of the first primary band and the second location of the second primary band. The first subchannel location scenario includes a first set of subchannels organized in a first ordering and the second subchannel location scenario includes a second set of subchannels organized in a second ordering. A mapping index is identified 710 based at least in part on the first location channel scenario and the second subchannel location scenario. The mapping index is used to determine 712 sub-band ordering. For example, the mapping index can be used to map the second set of subchannels in the second ordering to match to a reference ordering of subchannel of a reference subchannel location scenario. In an embodiment, the first and second set of subchannels includes a plurality of subcarriers. The mapping index is used to determine 714 subcarrier nulls. For example, the mapping index can be used to nullify (e.g., zero out) at least one subcarrier of the plurality of subcarriers based at least in part on the mapping index. Thereafter, a set of operation parameters or other such correction parameters can be determined 716. The operation parameters can be used 718 in at least one operation. For example, the operation parameters can be stored or otherwise applied to a computing device to compensate for changes in channel and/or bandwidth due to current channel, traffic, and interference conditions, allowing for spatial diagnostics independent of changes related to channel state parameters.

For example, the spatial diagnostics data associated with the WLAN can be utilized by various third parties, including the Telco or Wireless Service Provider to provide either directly or through application developers, a range of services to the home including: turning appliances or lights on and off as a person enters and exits a room, turning a WLAN node on and off as a person enters and exits a room, determining for home security purposes whether anyone is in the home and if they are then sounding an alarm or notifying the police of the intrusion and the room in which the intrusion is taking place, and determining for elder care monitoring what the activity pattern and times thereof are for an elderly individual on a room by room basis. For example, suppose the soundings of a WLAN link are conducted at 100 ms intervals. If those soundings are temporarily disrupted over a timescale which correlates with human activity, e.g. a human walking at a pace of 4-5 feet per second within a home on a path which intercepted a WLAN link might be expected to disrupt 8-12 successive soundings of the link. Furthermore, if other links are sequentially disrupted then knowledge of which links were disrupted by human activity and when, may be used to estimate a path of human activity within the home relative to the links.

Figure 8:
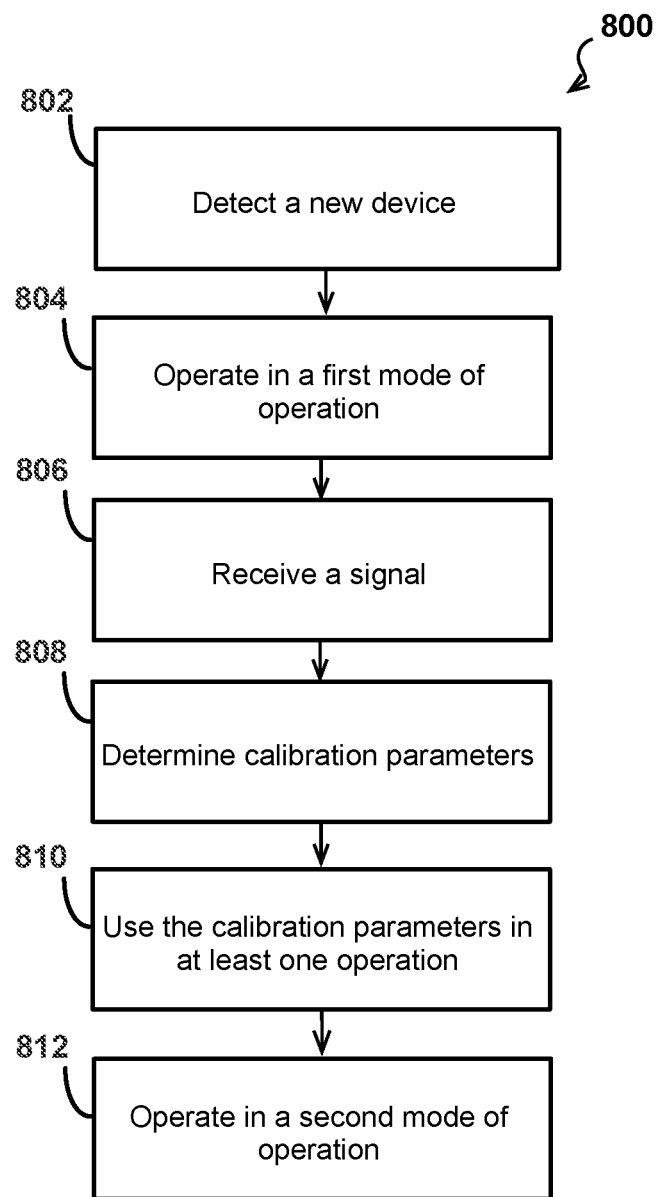
FIG. 8 illustrates an example process for determining calibration parameters in accordance with various embodiments.

FIG. 8 illustrates an example process 800 process for determining calibration parameters in accordance with various embodiments. In this example, a new device is detected 802 on a network (e.g., network 102 in FIG. 1). In response to detecting the new device (or detecting a change in channel, bandwidth, restart of a device, etc.) a control component or other components may operate 804 in a "fast-learning" mode or at an increased sampling rate, data decimation rate, collection periodicity, data resolution, higher bandwidth, etc. to quickly determine operation parameters and/or calibration parameters to eliminate or at least reduce an amount of time in adapting to the changes. It should be noted that although the fast-learning mode is described with respect to the determining calibration parameters, the fast-learning mode can be entered when determining operation parameters. In this way, spatial analysis can be conducted on a network device (e.g., WAP) or on a remote server without disrupting or altering normal WLAN activity, e.g. soundings and data communications. In accordance with an embodiment, the fast-learning mode can include a change in operation from a first mode of operation including one of a first sampling rate, a first data decimation rate, a first collection periodicity, a first data resolution, etc. to a second mode of operation including one of a second sampling rate, a second data decimation, a second collection periodicity, a second data resolution for a period of time. etc. In various embodiments, the second operation rate is greater than the first operation rate for respective rates and allows for spatial determinations without disrupting or altering normal WLAN activity, e.g. soundings and data communications. A signal is received 806 from the new device. The signal can be one of an implicit or an explicit signal. An example of an implicit signal includes signals that can be used as a training signal. This can include data communications as described herein. An example of an explicit signal includes a training signal, for example, a signal configured for channel estimation, e.g., Wifi preamble, NDP, etc.

In an embodiment, the new device can be associated with identification information such as a MAC address. In this example, a determination can be made whether the identification information matches stored identification information listed in a lookup table associated with a computing device (e.g., WAP, repeater, etc.) and/or stored in a database accessible to an appropriate computing device. The appropriate computing device and/or database can be local to the network, remote to the network, or a combination thereof. In the situation where a match is determined, parameters associated with the new device can be obtained and applied to an appropriate device. In the situation where no entry for the new device is listed in the lookup table, or otherwise not stored in the database or available to other devices, the new device can be classified as an unrecognized device.

The signal can be analyzed 808 to determine calibration parameters or other such parameters. In accordance with an embodiment, the calibration parameters can include parameters of CSI extraction, including CSI correction, sampling frequency, collection periodicity, data decimation, filtering, etc. The calibration parameters can be used 810 in at least one operation. For example, the calibration parameters can be stored in a data store, discarded, and/or applied to a network device (e.g., a WAP) to calibrate the network device to compensate for changes to a WLAN due to the unrecognized device. In various embodiments, calibration can include cycling through pre-defined BF patterns, fixing corrections to find the best using feedback, and calculating best transmission parameters as part of the calibration parameters for CSI sampling. This can include, for example, calibrating each channel and bandwidth where new pre-processing weights for normalization can be determined for use in the calibration parameters. Once the calibration parameters (and/or correction factors are determined), the control component or other such component can sample 812 at a default sampling rate or other sampling rate. Thereafter, an unrecognized device calibration (per link) on system startup can be determined on subsequent data communications.

In certain embodiments, the parameters can be applied to a device in communication with the unrecognized device, such as a WAP or other such device, or shared with a device not in communication with the unrecognized device. For example, the parameters can be shared with a different device local to the network such as a repeater on the network. In another example, the parameters can be shared with a remote device, such as a WAP, repeater, management device, or other such device on a remote network.

Figure 9:
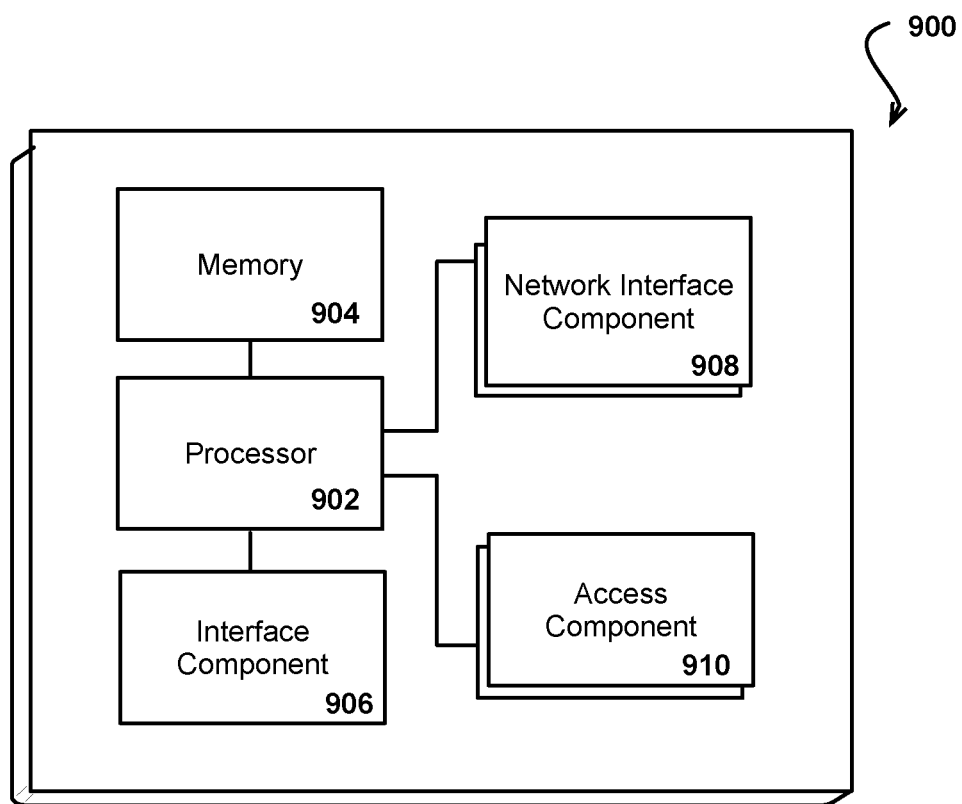
FIG. 9 illustrates example components of a computing device configured for implementing aspects in accordance with various alternate embodiments.

FIG. 9 illustrates an example set of basic components of a computing device 900, such as client devices 108, 110, 112, 114, network devices 104 and 106, and other such devices or components described in accordance with various embodiments herein. In this example, the device includes at least one central processor 902 for executing instructions that can be stored in at least one memory device or element 904. As would be apparent to one of ordinary skill in the art, the device can include many types of memory, data storage or computer-readable storage media, such as data storage for program instructions for execution by the processor 902, the same or separate storage can be used for data, a removable storage memory can be available for sharing information with other devices, etc. As described herein, the instructions, when executed by the processor, can be configured to execute spatial analysis program code associated with a WLAN spatial analyzer component (not shown). The program code may be configured to run on a single device or cooperatively on one or more host devices. The spatial analyzer component can include a sounding generator, a sounding aggregator, a spatial correlator. In addition to program code, the memory device can include link CSI records, spatial diagnostics data, and WLAN, and subscriber identification records.

In operation the sounding generator controls explicit and unsolicited soundings. For explicit soundings it controls the timing and generation of the sounding as well as the stations targeted for a sounding feedback response. In accordance with various embodiments where the isotropic sounding includes selected tones or subchannels with anisotropic radio frequency (RF) signal footprints, the selection of the anisotropically sounded tones and the determination of their distinct directionality is controlled by the sounding generator. For unsolicited soundings the sounding generator controls the determination of when the channel change warrants feed forward of link channel CSI as well as the actual sending of that feed forward sounding CSI. The sounding aggregator controls the aggregation of uplink, downlink, and crosslink CSI sounding feed forward and feedback and the storage of the associated CSI records in storage 904 as link channel CSI records. The spatial correlator correlates CSI from the explicit or unsolicited channel soundings with spatial characteristics of the WLAN including, for example, a change in location of a WLAN node, human activity among the WLAN nodes, structural impediments among WLAN nodes, and the like. The spatial correlator stores the resultant spatial diagnostics data in storage memory 904 or other such memory. The spatial correlator can correlate perturbations over time in the CSI of WLAN link(s) with at least one of: a change in location of an associated WLAN node and human activity across the WLAN link(s). In another embodiment, the spatial correlator correlates at least one of: magnitudes, time of flight, and multi-path properties of the CSI of the WLAN link(s) with the structural impediments to communications on said link(s).

Interface component 906 provides the APIs for accessing the spatial diagnostics data including a manifest template which includes the files, features and permissions required by the associated application. An application access control component 910 governs an applications access to spatial diagnostics data. This includes correlation of the manifest file permissions, the identity of the application user, and the WLAN owned by the application user with the corresponding spatial diagnostics data. The application access control module can use the subscriber and WLAN identifier table to make these determinations.

The device can include one or more networking components 908 enabling the computing device to communicate over one or more networks, whether wired and/or wireless. Networking components 908 can be utilized to operate computer device has a wireless access point (WAP) to host one or more devices servicing a wireless network. The networking components can support discrete communications with a computing device or concurrent multiple user multiple-input multiple-output (MU-MIMO) communications with multiple computing devices. The networking components 908 can support one or more IEEE 802.11 wireless local area network (WLAN) protocols.

The various embodiments can be implemented in a wide variety of operating environments, which in some cases can include one or more user electronic devices, integrated circuits, chips, and computing devices—each with the proper configuration of hardware, software, and/or firmware as presently disclosed. Such a system can also include a number of the above exemplary systems working together to perform the same function disclosed herein—to filter tones from a mixed signal using novel integrated circuits in a communications network.

Most embodiments utilize at least one communications network that would be familiar to those skilled in the art for supporting communications using any of a variety of commercially-available protocols, such as TCP/IP, FTP, UPnP, NFS, and CIFS. The communications network can be, for example, a cable network, a local area network, a wide-area network, a virtual private network, the Internet, an intranet, an extranet, a public switched telephone network, an infrared network, a wireless network and any combination thereof.

The environment can include a variety of data stores and other memory and storage media as discussed above-including at least a buffer. These storage components can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining spatial diagnostics data determined independent of changes to channel state parameters associated with a communication channel between computing devices in a network; and
   providing a service associated with a location at which the network exists using the spatial diagnostics data.

2. The computer-implemented method of claim 1, wherein providing the service associated with the location at which the network exists using the spatial diagnostics data comprises performing at least one of motion detection, proximity detection, or localization within the network.

3. The computer-implemented method of claim 1, wherein the spatial diagnostics data comprises a plurality of soundings of the communication channel and providing the service associated with the location at which the network exists using the spatial diagnostics data comprises determining whether the plurality of soundings include temporary disruptions over a timescale which correlates with human activity.

4. The computer-implemented method of claim 1, wherein providing the service associated with the location at which the network exists using the spatial diagnostics data comprises at least one of:
   turning a utility, a device, an appliance, a light, or a wireless node in a room on in response to the spatial diagnostics data indicating a person has entered the room; or
   turning the utility, the device, the appliance, the light, or the wireless node in the room off in response to the spatial diagnostics data indicating the person has exited the room.

5. The computer-implemented method of claim 1, wherein providing the service associated with the location at which the network exists using the spatial diagnostics data comprises at least one of:
   determining based on the spatial diagnostics data whether human activity is detected at the location;
   in response to the spatial diagnostics data indicating human activity at the location, generating and providing an alarm that indicates an unauthorized activity is present at the location; or
   wherein generating the alarm includes an indication of a particular room in which the unauthorized activity is present.

6. The computer-implemented method of claim 1, wherein the location comprises a residence and providing the service associated with the location at which the network exists using the spatial diagnostics data comprises determining based on the spatial diagnostics data at least one of:
   an activity pattern with associated times of a person within one or more rooms of the residence; or
   whether the person in the residence has fallen.

7. The computer-implemented method of claim 1, wherein the network comprises a wireless local area network (WLAN) and providing the service associated with the location at which the network exists using the spatial diagnostics data comprises diagnosing issues with WLAN operation of the WLAN based on the spatial diagnostics data indicating movement of at least one of the computing devices from a location at which performance was acceptable to a new location at which service interruptions are experienced.

8. A computing system, comprising:
   a computing device processor;

a memory device including instructions that, when executed by the computing device processor, enables the computing system to:
obtain spatial diagnostics data determined independent of changes to channel state parameters associated with a communication channel between computing devices in a network; and
provide a service associated with a location at which the network exists using the spatial diagnostics data.

9. The computing system of claim 8, wherein provide the service associated with the location at which the network exists using the spatial diagnostics data comprises perform at least one of motion detection, proximity detection, or localization within the network.

10. The computing system of claim 8, wherein the spatial diagnostics data comprises a plurality of soundings of the communication channel and provide the service associated with the location at which the network exists using the spatial diagnostics data comprises determine whether the plurality of soundings include temporary disruptions over a timescale which correlates with human activity.

11. The computing system of claim 8, wherein to provide the service associated with the location at which the network exists using the spatial diagnostics data comprises at least one of:
turn a utility, a device, an appliance, a light, or a wireless node in a room at the location on in response to the spatial diagnostics data indicating a person has entered the room; or
turn the utility, the device, the appliance, the light, or the wireless node in the room off in response to the spatial diagnostics data indicating the person has exited the room.

12. The computing system of claim 8, wherein to provide the service associated with the location at which the network exists using the spatial diagnostics data comprises at least one of:
determine based on the spatial diagnostics data whether human activity is detected at the location;
in response to the spatial diagnostics data indicating human activity at the location, generate and provide an alarm that indicates an unauthorized activity is present at the location; or
wherein the alarm includes an indication of a particular room at the location in which an intruder is present.

13. The computing system of claim 8, wherein the location comprises a residence and provide the service associated with the location at which the network exists using the spatial diagnostics data comprises determine based on the spatial diagnostics data at least one of:
an activity pattern with associated times of a person within one or more rooms of the residence; or
whether the person in the residence has fallen.

14. The computing system of claim 8, wherein the network comprises a wireless local area network (WLAN) and provide the service associated with the location at which the network exists using the spatial diagnostics data comprises diagnose issues with WLAN operation of the WLAN based on the spatial diagnostics data indicating movement of at least one of the computing devices from a location at which performance was acceptable to a new location at which service interruptions are experienced.

15. A computer-implemented method, comprising:
obtaining channel state parameters associated with a communication channel between computing devices in a network, the channel state parameters changing over time;
determining spatial diagnostics data independent of changes to the channel state parameters; and
providing a service associated with a location at which the network exists using the spatial diagnostics data.

16. The computer-implemented method of claim 15, wherein obtaining the channel state parameters between the computing devices in the network comprises:
obtaining first channel state parameters associated with the communication channel between a wireless access point (WAP) and a station node during a first period of time; and
obtaining second channel state parameters associated with the communication channel during a second period of time,
wherein each of the first state parameters and the second channel state parameters represent one or more characteristics of the communication channel, and
wherein the second period of time occurs after the first period of time.

17. The computer-implemented method of claim 15, further comprising:
detecting a trigger event on the network;
identifying a trigger type class of the detected trigger event based at least in part on the channel state parameters;
determining a set of optimization parameters based at least in part on the trigger type class; and
applying the set of optimization parameters to at least one of the computing devices in the network to compensate for changes in at least one of channel or bandwidth due to current channel, traffic, and interference conditions,
wherein the spatial diagnostics data is determined independent of changes to the channel state parameters in response to the compensation.

18. The computer-implemented method of claim 15, wherein the network comprises a wireless local area network (WLAN) and wherein the spatial diagnostics data is determined directly from the WLAN without interrupting or degrading a normal WLAN communication function of the WLAN.

19. The computer-implemented method of claim 15, wherein determining the spatial diagnostics data independent of changes to the channel state parameters comprises extracting channel state information (CSI) from the communication channel independent of the changes to the channel state parameters.

20. A computing system, comprising:
a computing device processor;
a memory device including instructions that, when executed by the computing device processor, enables the computing system to:
obtain channel state parameters associated with a communication channel between computing devices in a network, the channel state parameters changing over time;
determine spatial diagnostics data independent of changes to the channel state parameters; and
provide a service associated with a location at which the network exists using the spatial diagnostics data.

21. A method comprising:
monitoring activity at a location based on spatial diagnostics data associated with a communication channel of a network with a wireless access point (WAP); and
in response to detecting an unrecognized device at the location, calibrating the WAP to nullify parameters of the communication channel from the unrecognized device without disrupting communication with authorized devices.

22. The method of claim 21, wherein calibrating the WAP comprises adapting beamforming patterns of one or more communication links with the authorized devices of the network.

23. The method of claim 21, wherein calibrating the WAP comprises adapting frequencies of one or more communication links with the authorized devices of the network.

24. The method of claim 21, wherein calibrating the WAP comprises adapting a training signal of one or more communication links with the authorized devices of the network.

25. The method of claim 21, wherein nullify parameters from the unrecognized device adapts operating parameter or spatial diagnostics data from detection by the unrecognized device.

26. The method of claim 21, wherein monitoring activity at the location based on the spatial diagnostics data that indicates activity based on detecting perturbations in channel coefficients of channel state information (CSI) from the communication channel.

* * * * *